United States Patent [19]

Winston

[11] 4,223,937

[45] Sep. 23, 1980

[54] CONNECTING ROD CAP ALIGNMENT FIXTURE

[75] Inventor: John H. Winston, Menomonee Falls, Wis.

[73] Assignee: Outboard Marine Corporation, Waukegan, Ill.

[21] Appl. No.: 887,479

[22] Filed: Mar. 17, 1978

[51] Int. Cl.[3] .......................... B29C 17/02; B25B 7/12

[52] U.S. Cl. .......................... 294/103 R; 294/DIG. 2; 264/164; 81/363

[58] Field of Search .......................... 81/355, 362, 363; 74/53; 294/103 R, 34, DIG. 2; 264/138, 229, 164, 265

[56] References Cited

U.S. PATENT DOCUMENTS

| | | | |
|---|---|---|---|
| 514,752 | 2/1894 | Humphrey | 81/363 |
| 3,414,314 | 12/1968 | Martin | 294/103 |

FOREIGN PATENT DOCUMENTS

| | | | |
|---|---|---|---|
| 698686 | 11/1964 | Canada | 294/DIG. 2 |

*Primary Examiner*—Samuel Scott
*Assistant Examiner*—Gerald Anderson
*Attorney, Agent, or Firm*—Michael, Best & Friedrich

[57] ABSTRACT

A fixture for assisting in positioning the end cap of a connecting rod relative to the remainder of the rod, which fixture comprises a frame including a gauge portion having spaced ends, a first pair of angularly related wedge surfaces at one end of the gauge portion, and a handle portion extending from the other end of the gauge portion, a subframe carried by the frame for movement toward and away from the first pair of wedge surfaces and including a second pair of angularly related wedge surfaces located in spaced facing relation to the first pair of wedge surfaces, and means on the subframe and on the frame for moving the subframe relative to the first pair of wedge surfaces.

12 Claims, 6 Drawing Figures

CONNECTING ROD CAP ALIGNMENT FIXTURE

BACKGROUND OF THE INVENTION

The invention relates generally to production assembly of internal combustion engines, and more particularly, to arrangements for assembling the end cap on the main part of a connecting rod in such a manner as to obtain an aligned cylindrical relationship of the semi-cylindrical bearing surfaces provided on the end cap and main part. Still more particularly, the invention relates to fixtures for assisting in locating the end cap and main part of the connecting rod so as to cylindrically align the bearing surfaces thereof during final connection of the end cap to the main part of the connecting rod.

SUMMARY OF THE INVENTION

The invention comprises a fixture adapted for assisting in positioning the end cap of a connecting rod to the remainder of the rod, which fixture comprises a frame including a gauge portion having spaced ends, a first pair of angularly related wedge surfaces at one of the ends of the gauge portion, and a handle portion extending from the other end of the gauge portion, a subframe carried by the frame for movement toward and away from the first pair of wedge surfaces and including a second pair of angularly related wedge surfaces located in spaced facing relation to the first pair of wedge surfaces, and means of the subframe and on the frame for moving the subframe relative to the first pair of wedge surfaces.

In one embodiment of the invention, the first pair of wedge surfaces are supported on the frame by resilient means.

In one embodiment of the invention, the second pair of wedge surfaces are supported on the subframe by resilient means.

In one embodiment of the invention, the frame includes a bridge extending intermediate the first and second pairs of wedge surfaces.

In one embodiment of the invention, the wedge surfaces are respectively provided by rollers.

In one embodiment of the invention the frame further includes a first pair of axles respectively carrying the first pair of rollers, and resilient bushing means respectively supporting the first pair of axles from the frame, a second pair of axles respectively carrying the second pair of rollers, and resilient bushing means respectively supporting the second pair of axles from the subframe.

In accordance with one embodiment of the invention, the handle portion includes a hollow interior, the subframe includes a projecting portion extending within the hollow interior, and the means for moving the subframe comprises a toggle linkage extending, at least in part, in the hollow interior of the handle portion and connected between the handle portion and the projecting portion.

In accordance with one embodiment of the invention the toggle linkage includes a first link having one end connected to the handle portion, a second link having one end pivotably connected to the projecting portion and being pivotally connected to the first link and a handle end on the first link extending remotely from the end beyond the pivotable connection with the second link.

The invention also provides a method of manufacturing the end cap and main part of a connecting rod and assemblying the connecting rod to a crank pin, which method comprises the steps of separately fabricating the end cap and the main part, pre-assembling and securing together the end cap and main part, providing a cylindrical bearing in the assembled end cap and main part, which bearing includes semi-cylindrical bearing surfaces in each of the end cap and main part, fabricating, when the end cap and main part remain in pre-assembled relation, a plurality of shoulders which individually include respective parts extending along each of the end cap and main part, disassembling the end cap and main part, reassembling the end cap to the main part with the crank pin extending therebetween, partially securing together the end cap and the main part, applying to the partially secured together end cap and main part a fixture which is operative to engage and accurately align the associated shoulder parts on the end cap with the shoulder parts on the main part and thereby to cylindrically align the bearing surfaces to re-obtain the cylindrical bearing, and thereafter completing securing together of the end cap and main part with the bearing surfaces in cylindrical alignment.

One of the principal features of the invention is the provision of a fixture for assisting in aligning the end cap and main part of the connecting rod during engine assembly so that the semi-cylindrical bearing surfaces thereof are in cylindrical alignment.

Another of the principal features of the invention is the provision of a manufacturing and assembly method for obtaining a cylindrical bearing at the crank pin end of the connecting rod.

Other features and advantages of the embodiments of the invention will become known by reference to the following general description, drawings, and claims.

THE DRAWINGS

Figure 1:
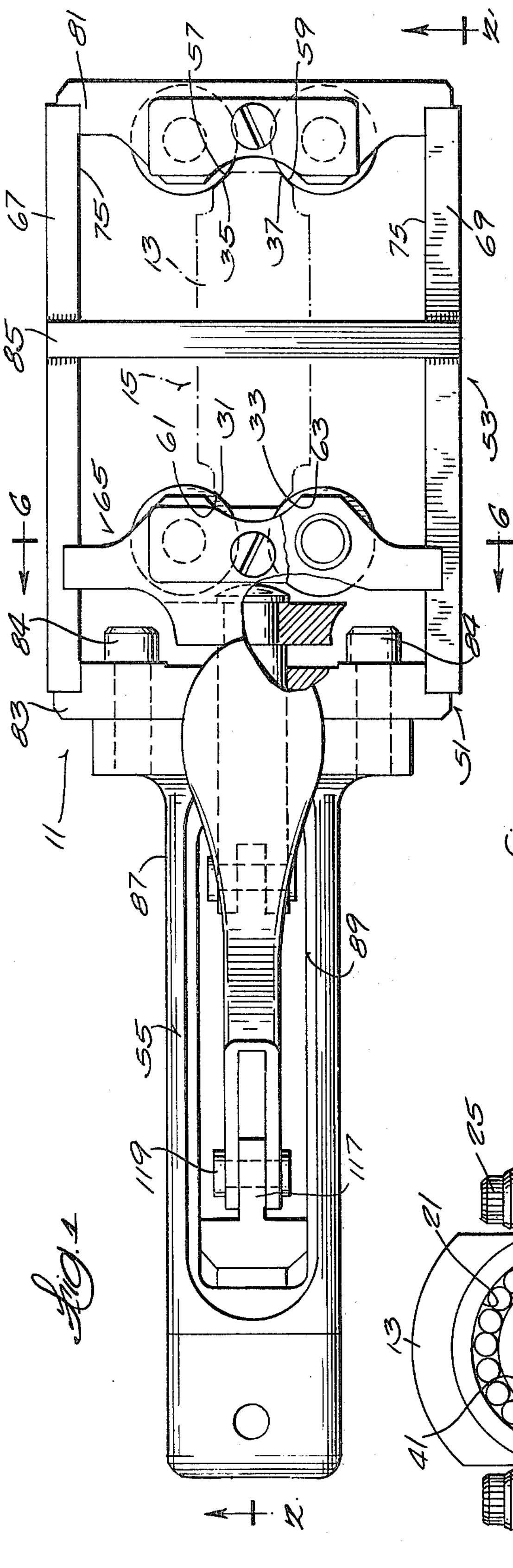
FIG. 1 is a top view with parts broken away and in section of a fixture embodying various of the features of the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Figure 2:
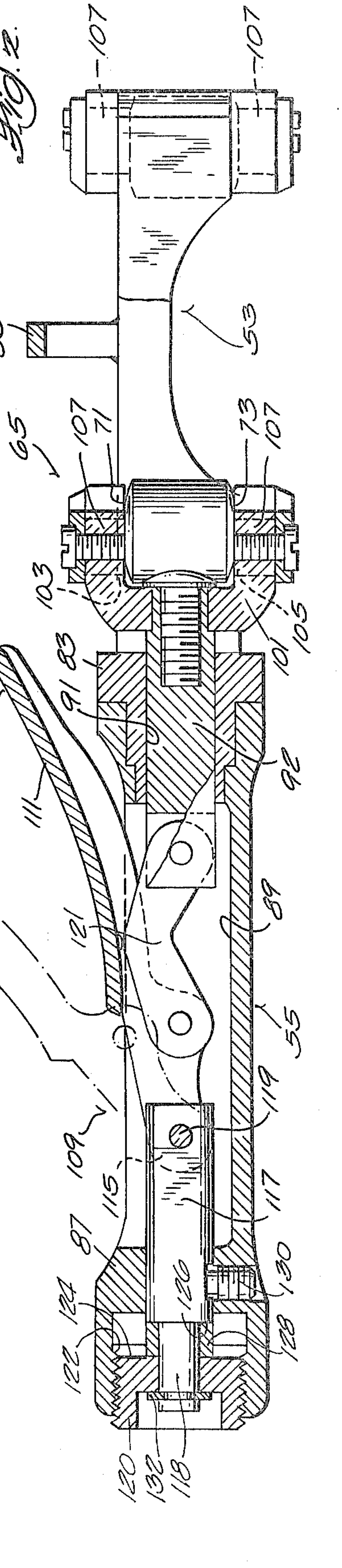
FIG. 2 is a sectional view taken generally along line 2—2 of FIG. 1.
Figure 3:
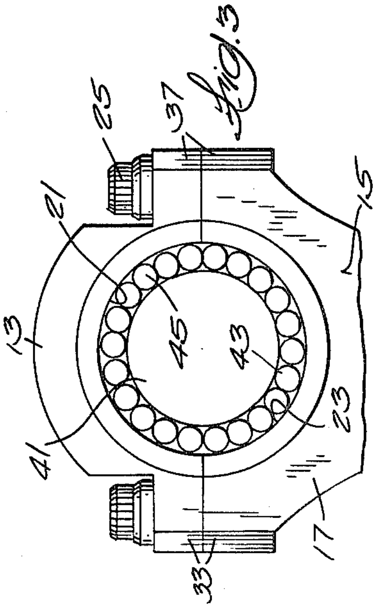
FIG. 3 is a fragmentary end view of a connecting rod to be aligned by the fixture shown in FIGS. 1 and 2.

Shown in FIGS. 1 and 2 of the drawings is a fixture 11 for assisting in locating or positioning (See FIG. 3) the end cap 13 of a connecting rod 15 in proper alignment with respect to the main part 17 of the connecting rod 15 during connection of the end cap 13 to the main part 17 during engine assembly. In this last regard, the end cap 13 and the main part 17 each include respective semi-cylindrical bearing surfaces 21 and 23 respectively, and prior to engine assembly are rigidly assembled together by tightening a pair of bolts 25, after which the bearing surfaces 21 and 23 are bored and ground so that the bearing surfaces 21 and 23 constitute a cylinder. Thereafter, when the end cap 13 and main part 17 are still secured together, respective chamfered shoulders or surfaces 31, 33, 35 and 37 are machined or ground on each of the four corners of the assembled connecting rod 15. As shown in FIG. 3, each of the shoulders 31, 33, 35 and 37 includes respective parts or portions extending along each of the end cap 13 and main part 17. Thereafter, the assembled connecting rod 15 is disassembled by removing the bolts 25 and separating the end cap 13 from the main part 17.

In subsequent assembly of the engine in which the connecting rod 15 is employed, a crankshaft pin 41 is placed into the semi-cylindrical surface 23 of the main part 17 of the connecting rod 15 with suitable bearing elements 43 therebetween, such as a series of roller bearings. The end cap 13 is then placed on the crankshaft pin 41 with suitable bearing elements 45 located therebetween. The bolts 25 which secure the end cap 13 to the main part 17 are then semi-tightened. At this point the fixture 11 disclosed herein is employed to accurately align the chamfered surfaces or corners 31, 33, 35 and 37 on the cap 13 and main part 17 prior to final tightening of the bolts 25 to fixedly secure the cap 13 and the main part 17 with the semi-cylindrical bearing surfaces 21 and 23 of the end cap 13 and main part 17 in cylindrically aligned relation.

The fixture 11 (See FIGS. 1 and 2) comprises a frame 51 having a gauge portion 53 and a handle portion 55, together with a first pair of wedge surfaces 57 and 59 mounted on the frame 51 for engagement of one pair of the chamfered shoulders 35 and 37 of the connected cap 13 and main part 17, and a second pair of wedge surfaces 61 and 63 which are carried on a subframe 65 movable toward and away from the first pair of wedge surfaces 57 and 59 and which are adapted to engage the other pair of chamfered shoulders 31 and 33 on the connecting rod 13 and main part 17.

Still further in addition, the fixture 11 includes means for moving the subframe 65 relative to the gauge portion 53 so as to accurately align the chamfered shoulders on the cap 13 with chamfered shoulders on the main part 17 and thereby to cylindrically align the semi-cylindrical bearing surfaces 21 and 23 all prior to final tightening of the bolts 25 to fixedly secure the end cap 13 on the main part 17 of the connecting rod 15.

More particularly, while other construction could be employed, in the construction illustrated, the gauge portion 53 of the frame 51 is rectangular or box-like in form and includes a pair of spaced, generally parallel side members 67 and 69 which include top and bottom surface portions 71 and 73 as well as inside or facing surfaces 75, and which are secured together by a pair of spaced, generally parallel end members 81 and 83. If desired, the frame 51 can be braced or rigidified by a bridge member 85 which connects the side members 67 and 69 intermediately of the end members 81 and 83.

The handle portion 55 is fixed to the end members 83, as by bolts 84, projects therefrom, and includes a handle part 87 having an exterior which is preferably knurled. The handle part 87 is partially hollow, i.e., includes a hollow interior 89 which communicates with an aperture 91 in the end member 83 through which extends a portion 92 of the subframe 65.

The first or fixed pair of wedge surfaces 57 and 59 are mounted on the end member 81 of the frame 15 and are adapted to engage the adjacent chamfered shoulders 35 and 37 on the end cap 13 and main part 17 of the connecting rod 15. While various construction can be employed, in the illustrated construction, the wedge surfaces 67 and 69 are provided by a pair of cylindrical rollers which are rotatably mounted on axes extending perpendicular to the plane of the subframe movement.

The subframe 65 includes a forked cross bar 101 which at each end, is recessed so as to provide, at each end, a pair of spaced surfaces 103 and 105 which respectively bear on and are movable along the top and bottom surfaces 71 and 73 of the side members 67 and 69. Connected to the cross bar 101 is the projecting portion 92 which (as already noted) extends through and is in bearing engagement with the aperture 91 in the end wall 83 and which projects into the hollow interior 89 of the handle part 87. The bearing engagement of the surfaces 103 and 105 with the top and bottom surfaces 71 and 73 of the side members 67 and 69 and the bearing engagement of the portion 92 with the end wall 83 confine the movement of the subframe 65 to rectilinear movement in one plane such that the cross bar 101 moves toward and away from the end member 81.

The second or movable pair of spaced wedge surfaces 61 and 63 are carried on the cross bar 101 and are adapted to engage the adjacent chamfered shoulders 31 and 33 of the end cap 13 and the main part 17 of the connecting rod 15. While various arrangements can be employed, in the illustrated construction, the wedge surfaces 61 and 63 are provided by a pair of cylindrical rollers which are rotatably mounted on the cross bar 101 about parallel axes extending perpendicular to the plane of subframe movement. It is noted that the axes of the four rollers are thus located in parallel relation to each other.

It is preferred that the axes of the rollers 57, 59, 61 and 63 be carried on the gauge portion 53 of the frame 51 and on the subframe 65 by resilient means affording a minor amount of movement of the roller axes so as to accommodate any slight distortion of the end cap 13 or main part 17 of the rod 15 occurring during clamping. Any suitable resilient mounting means can be employed, as for instance, resilient sleeves 107 made of rubber or other similar material.

Means are provided for moving the subframe 101 so as to displace the movable wedge surfaces or rollers 61 and 63 toward and away from the fixed wedge surfaces or rollers 57 and 59. While various arrangements can be employed, in the illustrated construction, there is employed a toggle-like linkage 109 which extends, in part, into the hollow interior 89 of the handle part 87 and which includes an actuating lever or link 111. The actuating lever 111 includes an outer end or handle 113 and an inner end 115 which is pivotally connected, about an axis 119 perpendicular to the roller axes, to a stud 117 which, preferably, is adjustably fixable to the handle part 87.

More particularly, in order to control the force applied against the shoulders 31, 33, 35 and 37 when the linkage 109 is moved to the full line position shown in FIG. 2, the stud 117 includes a reduced size end portion 118 which extends into an adjusting nut 120 which, in turn, is threadedly received in a socket 122 in the handle part 87. Located between the face 124 of the nut 120 and the opposed annular shoulder or flange 126 on the stud 117 is a washer or spacer 128. When the actuating lever 111 is in the full line position shown in FIG. 2, the shoulder 126 bears against the washer 128 which, in turn, bears against the nut 120 which can be adjustably located relative to the handle part 87, thus determining the desired position of the stud to obtain a particular clamping force. A set screw 130 is employed to fix the stud 117 in adjusted position relative to the handle part 87. In addition, a snap ring 132 is seated in the end portion 118 of the stud 117 in position for engagement with the nut 120 to prevent withdrawal to the right of the stud 117 from the nut 120 when the set screw 130 is not tightened and when the actuating lever 111 is moved to the dotted line position shown in FIG. 2.

The linkage 109 also includes a link 121 which, at one end, is pivotally connected, about an axis parallel to the axis 119, to the adjacent end of the subframe portion 92, and which, at its other end, is pivotally connected, about an axis parallel to the axis 119, to an intermediate part of the lever 111.

The lever 111 is swingable about the axis 119 relative to an extended position projecting outwardly at an angle from the handle part 87 (see the dotted line position in FIG. 2) so that the link 121 is drawn away from the gauge portion 53 so as to displace the subframe 65 to the left in FIG. 2 and thereby to locate the movable wedges or rollers 61 and 63 in the most remote position from the fixed wedge surfaces ro rollers 57 and 59. The outer end or handle 113 of the lever 111 is swingable inwardly of its extended position so as to move the link 121 toward the gauge portion 53 so as thereby to displace the movable rollers or wedge surfaces 61 and 63 toward the fixed rollers or wedge surfaces 57 and 69 until the rollers or wedge surfaces 57, 59, 61 and 63 tightly engage the shoulders 31, 33, 35 and 37, of the end cap 13 and main part 17, so as to locate the end cap 13 and the main part 17 with the semi-cylindrical bearing surfaces 21 and 23 in cylindrical alignment.

If desired, an air cylinder can be employed to either displace the subframe 65 toward the fixed rollers 57 and 59 so as to maintain the subframe 65 in position engaging the end cap 13 and main part 17 of the connecting rod 15 with a minimum force during the final tightening of the bolts 25 to complete assembly of the end cap 13 to the main part 17, or to move the actuating lever 111 to the full line or clamping position shown in full lines in FIG. 2.

In operation, the fixture 11 can be placed over a semi-connected end cap 13 and main part 17 and the outer end or handle 113 of the lever 111 can be squeezed by the operator with one hand so as to displace the subframe 65 toward the fixed rollers 57 and 59 and thereby to engage the wedge surfaces or rollers 57, 59, 61 and 63 and the chamfered shoulders 31, 33, 35 and 37 on the end cap 13 and main part 17 of the connecting rod 15 so as to locate the end cap 13 and main part 17 of the connecting rod 15 in proper alignment and to maintain the end cap 13 and main part 17 in correct alignment during final tightening of the bolts 25 which secure the end cap 13 to the main part 17 of the connecting rod 15.

Figure 5:
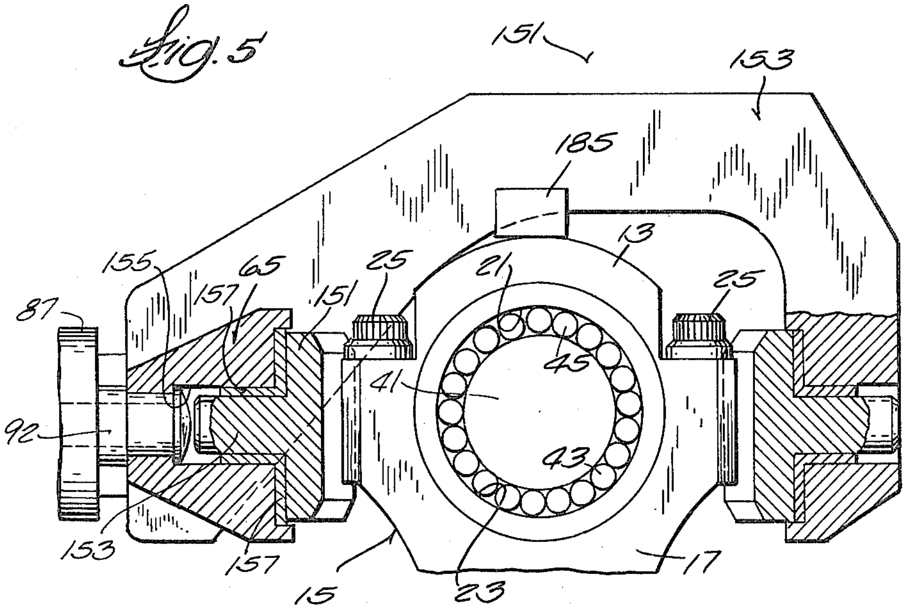
FIG. 5 is a sectional view taken generally along line 5—5 of FIG. 4.
Figure 4:
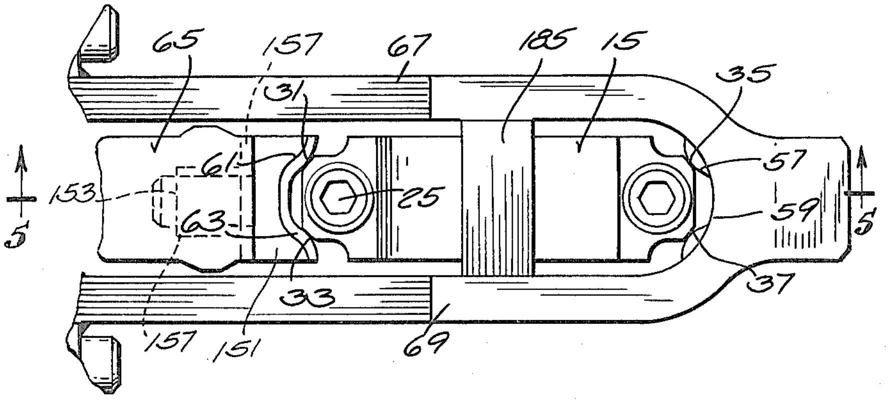
FIG. 4 is a top view of another embodiment of a fixture embodying various of the features of the invention.
Figure 6:
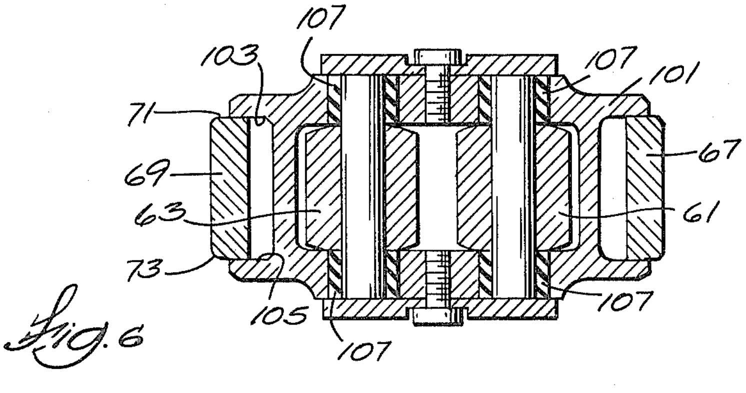
FIG. 6 is a sectional view taken generally alone line 6—6 of FIG. 1.

Shown fragmentarily in FIGS. 4 and 5 is another embodiment of a fixture 151 which incorporates various of the features of the invention. The fixture 151 is generally constructed along the same lines as the fixture 11 shown in FIGS. 1 and 2 except that the fixture 151 includes a gauge portion 153 which, when seen in side elevational view, is generally U-shaped and which is connected to a handle portion such as the handle portion 55 shown in FIG. 2.

In addition, the wedges 61 and 63 constitute surfaces on a fork-like member 151 which includes a shank 153 which is suitably connected to the subframe 65 which includes the projecting portion 92. In particular, the shank 153 extends into a recess 155 in the subframe 65. The fork-like member 151 is separated from the subframe 65 by an elastomeric bushing and flange 157 which affords limited movement in all directions of the wedges 61 and 63 relative to the subframe 65 so as to accommodate any slight distortion of the end cap 13 or or the main part 17 of the connecting rod 15 which may occur during clamping or otherwise.

Also included in the fixture 151 is a bridge 185 which is adapted to rest on the top of the connecting rod 15 so as to assist in locating the fixture relative to the connecting rod 15.

The fixture 151 shown in FIGS. 4 and 5 operates essentially in the same manner as the fixture 1 shown in FIGS. 1 and 2.

Various of the features of the invention are set forth in the following claims.

What is claimed is:

1. A fixture comprising a frame including a gauge portion having spaced ends, a first pair of angularly related wedge surfaces at one of said ends of said gauge portion, said first pair of wedge surfaces being provided by a first pair of rollers supported by a first pair of axles, resilient bushing means respectively supporting said first pair of axles from said frame, a handle portion extending from the other of said ends of said gauge portion, a subframe carried by said frame for movement toward and away from said first pair of wedge surfaces and including a second pair of angularly related wedge surfaces located in spaced facing relation to said first pair of wedge surfaces, said second pair of wedge surfaces being provided by a second pair of rollers supported by a second pair of axles, resilient bushing means respectively supporting said second pair of axles from said subframe, and means on said subframe and on said frame for moving said subframe relative to said first pair of wedge surfaces.

2. A fixture comprising a frame including a gauge portion having spaced ends, a first pair of angularly related wedge surfaces at one of said ends of said gauge portion, a handle portion extending from the other of said ends of said gauge portion and including a hollow interior, a subframe carried by said frame for movement toward and away from said first pair of wedge surfaces and including a second pair of angularly related wedge surfaces located in spaced facing relation to said first pair of wedge surfaces and a projecting portion extending within said hollow interior, and means on said subframe and on said frame for moving said subframe relative to said first pair of wedge surfaces, said means for moving said subframe comprising a toggle linkage extending, at least in part, in said hollow interior of said handle portion and connected between said handle portion and said projecting portion.

3. A fixture in accordance with claim 2 wherein in said toggle linkage includes a first link having one end connected to said handle portion, and a second link having one end pivotally connected to said projecting portion and being pivotally connected to said first link.

4. A fixture in accordance with claim 3 wherein said first link includes a handle end extending remotely from said one end beyond the pivotable connection with said second link.

5. A fixture comprising a frame including a gauge portion having spaced ends, a first pair of angularly related wedging surfaces at one of said ends of said gauge portion, a handle portion extending from the other of said ends of said gauge portion, a subframe carried by said frame for movement toward and away from said first pair of wedging surfaces and including a second pair of angularly related wedging surfaces located in spaced facing relation to said first pair of wedging surfaces, means on said subframe and on said frame for moving said subframe relative to said first pair of wedging surfaces, and resilient means for supporting at least one of said first pair of wedging surfaces and said second pair of wedging surfaces.

6. A fixture in accordance with claim 5 wherein said gauge portion is generally rectangular in shape.

7. A fixture in accordance with claim 5 wherein said gauge portion is generally of U shape.

8. A fixture in accordance with claim 5 wherein said frame includes a bridge extending intermediate said first and second pairs of wedging surfaces.

9. A fixture comprising a frame including a gauge portion having spaced ends, a first pair of angularly related wedging surfaces, first resilient means supporting said first pair of wedging surfaces at one of said ends of said gauge portion, a handle portion extending from the other of said ends of said gauge portion, a subframe carried by said frame for movement toward and away from said first pair of wedging surfaces, a second pair of angularly related wedging surfaces, second resilient means supporting said second pair of wedging surfaces on said subframe in spaced facing relation to said first pair of wedging surfaces, and means on said subframe and on said frame for moving said subframe relative to said first pair of wedging surfaces.

10. A fixture in accordance with claim 9 wherein said gauge portion is generally rectangular in shape.

11. A fixture in accordance with claim 9 wherein said gauge portion is generally of U shape.

12. A fixture in accordance with claim 9 wherein said frame includes a bridge extending intermediate said first and second pairs of wedging surfaces.

* * * * *